United States Patent [19]

Jones

[11] 4,117,056

[45] Sep. 26, 1978

[54] PRODUCTION OF BETA-ALUMINA CERAMIC ARTICLES

[75] Inventor: Ivor Wynn Jones, Chester, England

[73] Assignee: Chloride Silent Power Limited, London, England

[21] Appl. No.: 776,024

[22] Filed: Mar. 9, 1977

[30] Foreign Application Priority Data

Feb. 7, 1977 [GB] United Kingdom ............... 5007/77

[51] Int. Cl.$^2$ ............................................. C04B 35/10
[52] U.S. Cl. ..................................... 264/57; 264/65; 264/66; 264/85; 264/320; 264/332; 429/193
[58] Field of Search ................ 264/332, 320, 56, 66, 264/85, 57; 429/191, 193; 106/73.4

[56] References Cited

U.S. PATENT DOCUMENTS

| 3,795,723 | 3/1974 | Clendenen et al. ............... 429/191 |
| 3,950,463 | 4/1976 | Jones ..................................... 264/57 |

FOREIGN PATENT DOCUMENTS 1,300,864 12/1972 United Kingdom ................ 264/332

*Primary Examiner*—Robert F. White
*Assistant Examiner*—John A. Parrish
*Attorney, Agent, or Firm*—Beveridge, DeGrandi, Kline & Lunsford

[57] ABSTRACT

Beta-alumina ceramic articles of improved strength and durability particularly for use in sodium sulphur cells are produced by compacting beta-alumina particles or a mixture of powders which react to form beta-alumina, sintering the compacted material in air or oxygen to form an impervious polycrystalline ceramic body and then further densifying the sintered body by subjecting it to the direct isostatic pressing action of a fluid, e.g. a gas at a pressure of at least about 5,000 psi and at a temperature between 1200° C and 1500° C which is above the elastic/plastic transformation, said fluid being inert and non-permeating with respect to said fired body and subsequently cooling the body under pressure to a temperature below the elastic/plastic transformation.

11 Claims, No Drawings

PRODUCTION OF BETA-ALUMINA CERAMIC ARTICLES

BACKGROUND OF THE INVENTION

1. Field of the Invention

This invention relates to the production of beta-alumina ceramic articles.

2. Prior Art

The family of materials known under the generic name of beta-alumina are examples of polycrystalline solid electrolytes of the kind, sometimes referred to as superionic conductors, in which the polycrystalline grains have a framework structure, which permits rapid ionic diffusion of alkali metal ions in channels through the framework structure. Beta-alumina ceramic is well known as a polycrystalline ceramic material comprising primarily aluminium oxide with a small proportion of sodium oxide. The amount of sodium oxide in practice may range from 5% up to 10% by weight. The material may also contain up to 5% by weight of dopants, such as magnesium oxide or lithium oxide or various combinations of such dopants. The characteristic crystal structure of beta-alumina makes it useful as a separator, for example, in sodium sulphur cells and other electrochemical devices requiring the passage of sodium ions. Conventionally, beta-alumina ceramic articles are formed by compressing a powder, which may be powdered beta-alumina ceramic or may be a powdered mixture of oxide materials corresponding to the required overall composition to form the beta-alumina ceramic, and sintering this compressed powdered article at a suitable sintering temperature, which generally lies in the range 1500° to 1900° C. Methods of manufacturing of beta-alumina ceramic to the quality and integrity of other engineering ceramics are now well known. Generally it is necessary to control the grain size, the eliminate open porosity and reduce the closed porosity to a level of less than 5% by volume and preferably to a level of less than 1% by volume. It is known to produce beta-alumina by sintering in a closed crucible, see for example U.S. Pat. Nos. 3,404,036; 3,468,719 and 3,475,225. However, more recently, zone sintering techniques have been developed in order to produce materials of higher density and better mechanical integrity and an improved durability in electrochemical energy conversion devices such as sodium sulphur cells. These techniques are described in a paper by I. Wynn Jones and L. J. Miles "Production of B—$Al_2O_3$ Electrolyte" published in the Proceedings of the British Ceramic Society, No. 19, (March 1971) pp 161–178 and in U.S. Pat. Nos. 3,950,463; 3,903,225 and 3,869,019 and require the article to be sintered to be passed rapidly through a tubular furnace.

In the specification of British application No. 43183/74, I have described and claimed a method of producing beta-alumina ceramic articles by compressing powdered beta-alumina or a mixture of powdered materials which, on heating, produce beta-alumina, and sintering the compressed powder material to form an impervious ceramic material of at least 98% theoretical density, wherein the article, after sintering, is pressurised in a gaseous pressure medium at an elevated temperature below but within 500° C. of the sintering temperature. In that method, the article, after sintering, is subjected to hot isostatic pressing. The present invention relates to further improvements in the use of hot isostatic pressing, after sintering, of articles of beta-alumina ceramic.

It is known to improve the density of carbide materials and oxide ceramic materials by sheathless hot isostatic pressing. British patent specification No. 1,300,864 describes a method of producing a sintered article from a powdered material, in which a body of the powdered material is first sintered at atmospheric pressure or preferably under a vacuum and at such a temperature that the powdered particles are bound together, after which the sintered body is isostatically pressed to a high density, for example in a furnace in which the furnace is contained within a pressure chamber, under the direct influence of a pressure medium such as argon, helium, nitrogen or hydrogen, without being encapsulated in a sheath. Unlike beta-alumina ceramic, which is essentially a single phase material, the carbide materials, are two-phase materials and they are hot isostatically pressed at a temperature slightly above the liquids of the binder phase so that material is transported in the liquid phase. Carbide cutting tools manufactured by this method have an improved wear resistance, and a reduced risk of edge breaking, because of the elimination of pores. Other items, such as wire drawing dies, are strengthened because of the elimination of flaws. Further details of the process for improving sintered carbide materials are described by Lardner and Bettle in their article commencing on page 540 of the December 1973 Issue of the Journal "Metals and Materials".

The above-mentioned British patent specification No. 1,300,864 refers to the improving of the density of oxide ceramic materials by hot isostatic pressing for the oxide ceramic $UO_2$. However, the method described therein specified that the initial sintering takes place in a hydrogen gas atmosphere or in vacuum, and this leaves a vacuum or an atmosphere which is diffusible with respect to $UO_2$ polycrystalline lattice in the residual porosity. Thus, when the structure is densified in the second stage high temperature pressurisation, high pressures are not generated in closed porosity because the gases in the pores are able to escape by diffusion through the ceramic body.

More details of the process for use with polycrystalline oxide ceramics are described in U.S. Pat. No. 3,562,371. An article "Gas Isostatic pressing without moulds" in Part 2 of volume 54 of the Ceramic Bulletin published in 1975 reviews the background and provides further details of hot isostatic pressing of oxide ceramics, emphasising the benefits of reduced porosity for optical transmission in alumina envelopes for the high pressure sodium lamp, and transparent (Pb La) (Zr,Ti)$O_3$ (PLZT) ceramics for electro optical applications.

It may be seen, therefore, that the known art of forming of oxide ceramics extends to the concept of a combination of a defined sintering process with pressurisation at an elevated temperature.

In the description of the methods of prior art in the aforementioned documents there is no specification of the cooling process which follows the hot pressing stage, although in a description of a preferred embodiment in column 5 of the specification of U.S. Pat. No. 3,562,371 it is stated that "after 1 hour, the pressure is released and the sample is cooled to ambient temperature". There is no mention of the process variables of the cooling part of the cycle in the previously mentioned article "Gas isostatic pressing without moulds".

It would appear, therefore, that the known art of hot gas isostatic pressing of oxide ceramics would lead one experienced in the art to release the pressure before the ceramic is cooled, after the pressurisation stage. Such a procedure would be expected to minimise the residual stresses, which would be expected to be present after the ceramic is subjected to deformation during the pressurisation process. Such stresses would be expected to reduce the mechanical integrity of a brittle oxide ceramic. It is believed that a polycrystalline ceramic in which the grains are anisotropic in their deformation characteristics, i.e., have different Youngs modulus in the different crystal axes, would contain damaging residual stresses if cooled under pressure after a hot deformation process.

It is noteworthy that there has been no application of mouldless isostatic pressing at elevated temperatures to the framework structured superionic conductors, and a logical reason for this could lie in a concern by those skilled in the art of manufacturing these materials about the thermodynamic stability of these materials at elevated temperatures and pressures. Further details are given in a report entitled "Development of Sodium Sulphur Batteries for Utility Application" EPRI EM-266 (Research Project 128-3) which was an annual report of the Electrochemistry Branch of the Research and Development Centre of the General Electric Company, Schenectady, N.Y. 12301, prepared for the Electric Power Research Institute, 3412 Hillview Avenue, Palo Alto, Calif. 94304. The decomposition of $\beta$ and $\beta''$ variants of beta-alumina at relatively low pressures and at an elevated temperature is discussed on pages E55 and E56 of the report.

The durability of polycrystalline beta-alumina ceramic materials in sodium sulphur cells is known to be affected by the development of internal stresses in the solid electrolyte. One known mechanism for the development of such damaging internal stresses is the substitution of alternative ions, such as potassium, into the lattice in place of the sodium ions. In the article "Beta-alumina electrolytes" in Progress in Solid State Chemistry Vol. 7 (J. O. McCaldin, Howard Reiss, Editors, Pergamon, N.Y. 1972), J. T. Kummer describes on page 155 how ion exchanging of potassium into sodium beta-alumina ceramic by immersing said ceramic in molten sodium nitrate causes the polycrystalline ceramic to fracture. It is also known that ion exchange from potassium containing glasses, used to seal the beta-alumina membrane to other portions of the cell, can reduce the durability of the electrolyte in sodium sulphur cells. Potassium is a larger ion than sodium, and so when it is ion exchanged for sodium in beta-alumina the 'C' axis expands by approximately 0.2A°. There is little change in the 'a' axis dimension. Thus in a polycrystalline lattice of randomly oriented grains such ion exchange causes the 'c' axis of the polycrystals to be placed in compression and the 'a' axes to be placed in tension

SUMMARY OF INVENTION

According to the present invention, a method of manufacturing a beta-alumina ceramic article comprises the steps of (a) compacting finely-divided particles of beta-alumina or a mixture of finely-divided powdered materials which react together, on heating, to form beta-alumina so as to produce a homogeneous green compact, and sintering the green compact to form an impervious polycrystalline ceramic;

(b) isostatically pressurising the sintered body at a temperature between 1200° C. and 1550° C. at a pressure of at least 5,000 psi;

(c) cooling said body under pressure to a temperature below 1200° C.; and (d) then releasing the pressure.

By this method, an improved polycrystalline beta-alumina ceramic article, e.g. a solid electrolyte separator is produced. After sintering, the article is pressurised at a temperature of above the plastic elastic transformation temperature and is then cooled under pressure to a temperature below the plastic-elastic transformation. The pressurising is effected at a temperature which is in excess of 1200° C. but not above 1550° C. Heat treatment above 1550° C. produces an undesirable ceramic microstructure.

Although conventional hot pressing in oxide dies is known to produce oxide ceramic articles of high density when the applied pressure is 5,000 psi or less, it is necessary in carrying out the present invention to cool the article under a pressure of 5,000 psi or more, probably in order to obtain adequate deformation of the 'c' axis as hereinafter explained.

I have found unexpectedly that this method of completing the manufacture of an article of beta-alumina produces a material which when used as a separator in a sodium sulphur cell has a durability which is very significantly improved over that of materials which have not been so treated.

The results were unexpected because it is believed that such a treatment produces a ceramic which contains locked-in stresses. Indeed it is believed that the stresses are qualitatively similar to those produced by ion exchange i.e., the ceramic produced by the method of this invention contains grains in which there is an increased compression of the 'c' axis and an increased tension of the 'a' axis.

It is not at all clear why an increased compression of the c axis of the grains produced by this method results in improved durability whereas the increased compression of the 'c' axis caused by potassium ion grains causes a drastically reduced durability. The 'c' axis of the $\beta$ or $\beta''$ polycrystalline grains is normal to the conducting planes in which the rapid diffusion takes place. It has been argued that the structure of the conducting planes is liquid-like within the superstructure of the framework lattice.

One mechanism for the degradation of beta-alumina ceramic is known to be the initiation and propogation of microcracks from the sodium electrode interface of the solid electrolyte. It is believed that the initiation and propogation of the cracks depends phenomenologically on the current density in the ceramic and the integral as a function of time of the current density i.e., the accumulated current passed through the appropriate area of the electrode/electrolyte interface normalised to unit area. It is not clear why the localised stresses produced by cooling the ceramic through its elastic-plastic transformation under an applied pressure produces an improved durability, whereas the stresses caused by ion-exchange with potassium cause a reduced durability. Both processes are thought to cause compression in the 'c' axis of grains and tension in the 'a' axis if grains in the polycrystal. The benefit of the method of this invention lies in a precise definition of the stress vector distribution function in the polycrystalline structure. This beneficial result was unexpected.

Pressures between 10,000 and 20,000 psi are preferred for electrolyte manufactured by zone sintering methods but higher pressures can be used. It has been found particularly convenient to cool from a temperature of about 1400° C. to less than 1000° C. under a pressure of 15000 psi.

Ceramic electrolyte for energy conversion devices and material conversion devices is conveniently formed as thin-walled cylindrical tubes. The mechanical strength of such tubes may be measured by more than one method. Internal pressurisation places the entire tube wall under tensile hoop stress, and bursting of such a tube locates the weakest point in the tube wall. Alternatively the tube may be slitted into a number of ring specimens, which can be individually tested by diametric compression. This places a small region adjacent to the inner surface opposite the loading anvils under tension. This method does not find the weakest link in a tube, but finds the distribution function of local fracture strengths throughout the tube. Results may conveniently be analysed by Weibull statistics, which has a term to allow for volume effects.

When the mechanical strength of ceramic electrolyte tubes as manufactured in accordance with the method described above are compared with the mechanical strength of ceramic tubes manufactured without the hot isostatic pressing and subsequent cooling under pressure, the results achieved at first sight may appear ambiguous. I have found that, when a beta-alumina ceramic with a density of 3.16 gms cm$^{-3}$ after sintering is pressurised under argon to 1000 bars at 1320° C., the density is increased, but the strength is decreased. However, in a sample of material which had been sintered in air to a density in excess of 3.20 gm cm$^{-3}$ subsequent pressurisation under argon to 1000 bars at 1320° C. substantially removed all porosity from the sample, and a small but significant increase in mechanical strength was observed following a statistical analysis of Bortz ring test results.

Ambiguous results are also obtained from an analysis of the bursting stress of a number of tubular specimens. Some tubes become fully densified and are strengthened, whereas other tubes are less well densified and are clearly weakened. Improvements of mechanical strength are usually noted when the initial sintering has been carried out under optimum conditions to give a density of 3.20 or greater. Such effects could be the result of a balance between two competitive effects, strengthening because the elimination of flaws in the pressing process as is known in other examples of hot isostatic pressing and internal stresses which cause weakening.

However, it will be clear to those skilled in the art that even in those instances where strengthening is observed the effect is too small to much effect the performance in a cell. The solid electrolyte in such cells is subjected to stresses in the region of the seal because of the mismatch of expansion coefficients of components. The strength of beta-alumina manufactured by normal methods is well able to withstand such efforts. In order to withstand the sealing stresses and other stresses that occur during thermal cycling of the cell it is usual to construct solid electrolyte energy conversion devices using tubular shapes of the solid electrolyte since such shapes are well able to withstand such stresses.

Provided that cell designs and manufacturing methods that are familiar to those skilled in the art are used, such cells can usually be guaranteed to have a mean time to failure in excess of 100 cycles. In building such a cell it is important to take precautions when filling it with iquid sodium. Liquid sodium is a very good heat transfer medium, and it may thermally shock the ceramic if poured into the cell when the sodium temperature is significantly different from the ceramic temperature. Thermal shocking can initiate small cracks on the surface of the beta-alumina. Subsequently these cracks can propagate due to the development of poiseuille pressure when sodium metal is generated in the crack on charge and flows out of the crack.

It is more difficult to manufacture cells which operate reliably for well over 100 cycles and preferably up to 1000 cycles. The mechanisms of failure that are responsible for failure after such extended periods of operation are not as well understood as the short term failure mechanism. However, it is believed that tensile cracks can initiate on the sodium electrode interface of the solid electrolyte in regions where sodium efflux is concentrated during charging of the cell. At a fixed current density it is believed that cracks are initiated after a certain accumulation of sodium transport during cycling of the cell.

Whereas such crack initiation is usually thought to be enhanced by the application of external stresses or the generation of stresses in the ceramic by ion exchange, the tailoring of a precise stress distribution by the method of this invention is found to give a significant improvement of durability.

In the practical production of beta-alumina superionic conductor materials, the production processes up to and including the sintering stage would be optimised to ensure that, as far as possible, all of the articles have a low porosity so that their overall mechanical strength is not significantly weakened, but is preferably strengthened during the pressurisation treatment. Preferably sintering is effected using a zone sintering technique, and the process variables of time, temperature and atmosphere are optimised empirically, by methods which are well known. The pressurising is most conveniently effected using an inert gas for example argon gas. As is known for hot isostatic pressing techniques, the articles may be placed in an oven which is then heated. The pressure in the oven rises due to the rise in temperature. The gas is preferably initially pressurised, but the final pressure to which the articles are subjected depends on the temperature because of the gas laws. As a typical example the pressure employed may be 15,000 psi at a temperature of 1380° C. However, the improvement that is achieved is obtained during the subsequent cooling process, and a significant pressure has to be maintained until the temperature has fallen below the elastic plastic transformation. Typically this transformation takes place at 1200° C. or above. It will be appreciated that the loss of pressure that occurs in accordance with the gas laws during the cooling through the plastic elastic transformation is relatively small so that beneficial results are still obtained when this takes place. However, the pressure must not be fully released at the pressing temperature as has been recommended for the normal process of reducing porosity in sintered articles.

DESCRIPTION OF THE PREFERRED EMBODIMENT

The following is a description of a preferred manner of manufacturing beta-alumina ceramic articles of tubular form using the method of the present invention.

In the preparation of these articles, the fast firing technique described and claimed in U.S. Pat. No. 3,950,463 and British Pat. No. 1,458,221 was used, the sintering furnace being a sloped tube sintering furnace employed in the manner described in British patent specificatin No. 1,458,222 to give an airflow through the furnace in the direction in which the article is passed through the furnace.

In the method of specification No. 3,950,463 sintering is effected by passing the article rapidly through a furnace having a temperature profile increasing in temperature from one end up to a maximum sintering temperature between 1600° and 1900° C. and decreasing towards the othe end, the length of the sintering zone being such that any point in the material is in this sintering zone for a period less than 3 minutes and typically between 12 seconds and 2 minutes. The temperature profile of the furnace and the rate of traverse of the material are preferably such that any point in the material is heated up to the sintering temperature and cooled from the sintering temperature at a high rate, typically between 200° C. per minute and 2400° C. per minute. The article thus spends only a short time at the maximum temperature. This is important because it is well-known that the processes which cause grain growth and sintering in ceramic materials increase exponentially with temperature. The maximum temperature is therefore carefully controlled and, typically, only the regions of the hot zone that are within 10° C. of this maximum temperature are used to calculate the time at temperature for the sintering process. The sintering region can be quite short and might typically be 50 mm, the speed of traverse being such that the material of any part of the tube is in this sintering zone for less than 3 minutes and typically 1 minute. This technique is sometimes referred to as zone sintering.

EXAMPLES

A powder mixture comprising 2 wt % MgO, 8.0 wt % $Na_2O$ and 90 wt % $Al_2O_3$ was formulated from ALCOA X A 16 superground alumina, Unifloc sodium aluminate and BDH Analar MgO. The mixture was dry-milled for 48 hrs in a rubber-lined vibro-energy mill using pure alumina grinding media, then it was sieved through a 50 micron nylon sieve, and then vibro-energy milled for a further 12 hours. The median particle size of the ALCOA X A16 superground alumina is less than 1 micron as supplied, and this size is not much reduced during the dry milling process, which comminutes the sodium aluminate and the magnesium oxide, and produces an intimate mixture of the three constituents. Then the powder was pressure moulded at 40,000 psi in polyurethane moulds to form tubes approximately 25 mm i.d. 29 mm o.d. and 270 mm long. The tubes were closed at one end. They were dried in an oven which was programmed to heat to 700° C. in 2 hours, and then remain at 700° C. for 4–5 hours. For the drying stage the tubes were contained in muffles. The muffles prevented excessive gas convection and loss of sodium oxide, but were open at one end to allow water vapour to be evolved in the drying process. The tubes were then sintered in a sintering furnace as described above by moving them axially through a 35 mm diameter alpha-alumina furnace tube at a rate of 40 mm per minute. The alpha-alumina tube was rotated at a rate of 25 rpm, and inclined at an angle of 7° to the direction of motion through the furnace. The centre of the alpha-alumina firing tube was heated by an inductively heated carbon susceptor, as described in the aforementioned British specification No. 1,458,222. The maximum temperature in the firing zone was 1718° C., and on each side of the peak the temperature decreased as a parabolic function of distance from the hottest point. The speed of movement of the tubes through the furnace was such that each part of the tube passed through the sintering zone i.e., the zone at the sintering temperature or at a temperature up to 10° C. below the sintering temperature, in a time between 12 seconds and 5 minutes. The slope of the furnace tube was such that a convective airflow occurred through the furnace in the direction of movement of the article to carry the volatile constituents forward with the article so that sintering was effected in a sodium oxide rich atmosphere. There was approximately 11% linear shrinkage during sintering. Analysis of the sintered body showed that there was a slight loss of sodium oxide (approximately 0.4% by weight) during sintering.

Using the above-described technique, tubes can be produced which have a density uniformly in excess of 3.2 g $cm^{-3}$ i.e. about 98% theoretical density.

Six tubes were selected from this production run for testing in cells. After the outer diameter near to the open end was machined to the required tolerance with a diamond impregnated grinding wheel, the tubes were tested for imperviousness by vacuum and helium testing, and then tested for mechanical integrity by a pressure proof test.

Three of the tubes were then placed on a thin layer of alumina powder on graphite trays and were then pressurised for one hour at 15,000 psi in a stainless steel lined furnace contained in a pressure vessel which was heated internally to 1380° C. The pressurisation cycle consisted of pressurisation with argon to about two thirds the required ultimate pressure whilst cold, the furnace being then heated to its operating temperature which raised the pressure to the working level. The furnace was held in this condition for about one hour. Under these conditions the polycrystalline body behaves as a plastic body due to slippage at grain boundaries and dislocations and solid state diffusion. The individual grains deform independently of each other in the '$a$' and '$c$' directions. Deformation is greater in the '$c$' direction than in the '$a$' direction. After 1 hour the furnace was cooled to room temperature and then the pressure was released.

The pressure remained above 80% of the maximum applied pressure during cooling to the elastic plastic transformation temperature.

Three sodium sulphur cells were manufactured using a tube which had been pressurised as described above and three further cells were manufactured using tubes from the same sintering run, but without the pressurisation and cooling step. The construction of these cells was similar to that described in the specification of U.S. Pat. No. 3,982,957. The cells had sulphur electrodes inside the electrolyte tubes, carbon rod, current collectors in the sulphur electrode and gravity fed sodium electrodes.

The cells were placed in an air thermostat at 330° C. and charge discharged cycled three times per day. One of the control cells failed after 462 cycles and another of the control cells failed after 508 cycles. Both cells failed as a result of fracture of the electrolyte. The third control cell continued to operate for 1000 cycles. The three cells containing electrolyte which had been cooled under pressure through the elastic plastic transformation all survived 1000 cycles. It is well known that the life of cells of nominally identical construction may vary widely from the average value, and the exact significance of the improvement obtained using this invention can only be appreciated from a full statistical treatment, and this is difficult because of the need for a large number of cells and a long testing time. However the results indicate that the probability of cells surviving 1000 charge/discharge cycles is increased at least by a factor of 3 by the pressurised cooling method described above.

It should be understood that the above-described example is of one specific embodiment of this invention. Many variations of detail for the sintering, and composition of the solid electrolyte and other cell designs for sodium-sulphur cells, such as a single tube cell with sodium inside the electrolyte tube and the cathodic reactant outside the tube or multitube designs, may be used employing beta-alumina tubes made in accordance with this invention to give an improved durability.

It is well known that sintering may be carried out in an atmosphere of wet or dry oxygen. The grain structure of the ceramic may be altered by changing the time or temperature of the sintering process or by modifying the construction of the starting powder. High temperatures and long times produce a duplex grain structure. The addition of a small percentage, typically 10% by weight, of finely comminuted seeds of crystalline $\beta''$ alumina produces a regularly recrystallised micromorphology under sintering conditions where a very fine microstructure would be produced under normal sintering conditions. Those who are skilled in the art will know that such changes usualy increase the temperature of the plastic/elastic transformation in ceramic bodies and therefore, in carrying into practice the method of the present invention, the process variables have to be modified to suit the individual microstructures.

I claim:

1. A method of manufacturing a beta-alumina ceramic article comprising the steps of:
    (a) compacting finely-divided particles of beta-alumina or a mixture of finely-divided powdered materials which react together, on heating, to form beta-alumina so as to produce a homogeneous green compact, and sintering the green compact to form an impervious polycrystalline ceramic;
    (b) isostatically pressurising the sintered body at a temperature above the elastic/plastic transformation and between 1200° C. and 1550° C. at a pressure above 5000 psi;
    (c) cooling said body under pressure to a temperature below the elastic/plastic transformation and below 1200° C.; and
    (d) then releasing the pressure.

2. A method as claimed in claim 1 wherein the hot isostatic pressing is effected at a temperature within 400° C. of the sintering temperature.

3. A method as claimed in claim 1 wherein the sintering is effected using a zone-sintering method.

4. A method as claimed in claim 1 wherein a pressure of at least 10,000 psi is maintained during the pressurising step and during the subsequent cooling to a temperature below 1200° C.

5. A method as claimed in claim 1 wherein the pressurising is effected at a temperature of about 1400° C.

6. A method as claimed in claim 5 wherein the cooling under pressure is from a temperature of about 1400° C. to a temperature less than 1000° C.

7. A method of manufacturing a beta-alumina ceramic article of high density comprising the steps of:
    (a) compacting mixed finely-divided particles of beta-alumina or a mixture of materials which, on heating together, react to form beta-alumina to form a homogeneous green compact;
    (b) passing the green compact through a tubular furnace to zone sinter the compact, the rate of movement of the article through the furnace being such that each part of the article is in the sintering zone, wherein the temperature is above the sintering temperature, for a time between 12 seconds and 2 minutes, while simultaneously passing air through the furnace in the same direction as the article to carry volatile constituents through the furnace with the article to maintain a sodium oxide-rich atmosphere in the furnace, and thereby to form an impervious finegrained polycrystalline ceramic of uniform density in excess of 3.2 g cm$^{-3}$;
    (c) subjecting the sintered body, at an elevated temperature above the elastic/plastic transformation and between 1200° C. and 1550° C. to the direct isostatic pressure of a gas at a pressure of at least 5,000 psi, the gas being inert and non-permeating with respect to said ceramic body;
    (d) cooling said sintered body under pressure to a temperature below the elastic/plastic transformation and below 1200° C.; and
    (e) then releasing the pressure.

8. A method as claimed in claim 7 wherein a pressure of at least 10,000 psi is maintained during the cooling down to the elastic/plastic transformation temperature.

9. A method as claimed in claim 7 wherein the isostatic pressurising is at a pressure between 10,000 and 20,000 psi.

10. A method as claimed in claim 7 wherein said body is cooled from a temperature of about 1400° C. to less than 1000° C. under a pressure of between 10,000 and 20,000 psi.

11. A method as claimed in claim 7 wherein the hot isostatic pressing is effected with argon gas.

* * * * *